United States Patent
Xue et al.

(10) Patent No.: US 12,418,463 B2
(45) Date of Patent: Sep. 16, 2025

(54) INFORMATION ACQUISITION METHOD AND APPARATUS, STORAGE MEDIUM, AND ELECTRONIC APPARATUS

(71) Applicant: ZTE Corporation, Shenzhen (CN)

(72) Inventors: Yan Xue, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/927,994

(22) PCT Filed: Apr. 22, 2021

(86) PCT No.: PCT/CN2021/088981
§ 371 (c)(1),
(2) Date: Nov. 28, 2022

(87) PCT Pub. No.: WO2022/001314
PCT Pub. Date: Jan. 6, 2022

(65) Prior Publication Data
US 2023/0216758 A1    Jul. 6, 2023

(30) Foreign Application Priority Data
Jun. 29, 2020  (CN) .......................... 202010605286.1

(51) Int. Cl.
*H04L 43/04*    (2022.01)
*H04L 41/5009*  (2022.01)

(52) U.S. Cl.
CPC .......... *H04L 43/04* (2013.01); *H04L 41/5009* (2013.01)

(58) Field of Classification Search
CPC ..... H04L 9/40; H04L 67/1097; H04L 5/0048; H04L 5/0057; H04L 25/0224;
(Continued)

(56) References Cited

U.S. PATENT DOCUMENTS 10,897,296 B2 *  1/2021  Takano ................. H04W 76/25
11,424,874 B2 *  8/2022  Yoshimoto .......... H04W 52/146
(Continued)

FOREIGN PATENT DOCUMENTS

CN    103780406 A    5/2014
CN    109788030 A    5/2019
(Continued)

OTHER PUBLICATIONS

International Search Report for corresponding application PCT/CN2021/088981 filed Apr. 22, 2021; Report dated Jul. 21, 2021.
(Continued)

*Primary Examiner* — Dustin Nguyen
(74) *Attorney, Agent, or Firm* — CANTOR COLBURN LLP (57) ABSTRACT

An information acquisition method and apparatus, a storage medium, and an electronic apparatus are provided. The method includes: a first network element obtains first acquisition information indication; the first network element determines acquisition indication information corresponding to the first network element according to the first acquisition information indication; and the first network element performs information acquisition and processing according to the acquisition indication information corresponding to the first network element.

18 Claims, 3 Drawing Sheets

---

A first network element obtains first acquisition information indication — S202

The first network element determines acquisition indication information corresponding to the first network element according to the first acquisition information indication — S204

The first network element performs information acquisition and processing according to the acquisition indication information corresponding to the first network element — S206

(58) Field of Classification Search
CPC ........ H04L 25/03898; H04W 36/0022; H04W 52/50; H04W 72/542; H04W 74/4004; H04W 76/15; H04W 52/146; H04W 72/23; H04W 76/25; H04W 28/0268; H04N 19/30
See application file for complete search history.

(56) References Cited

U.S. PATENT DOCUMENTS

| | | | | |
|---|---|---|---|---|
| 11,870,731 | B2* | 1/2024 | Noh | H04L 5/0057 |
| 2008/0192766 | A1* | 8/2008 | Ranta-Aho | H04W 74/004 370/445 |
| 2010/0151870 | A1* | 6/2010 | Piercy | H04W 52/50 455/67.11 |
| 2015/0009898 | A1* | 1/2015 | Rosa | H04L 5/0048 370/328 |
| 2015/0341100 | A1* | 11/2015 | Kwak | H04L 25/03898 370/329 |
| 2017/0373743 | A1* | 12/2017 | Park | H04L 25/0224 |
| 2018/0035328 | A1 | 2/2018 | Chen | |
| 2019/0150123 | A1* | 5/2019 | Nogami | H04W 72/23 370/330 |
| 2019/0199802 | A1* | 6/2019 | Zhu | H04L 9/40 |
| 2019/0223154 | A1 | 7/2019 | Jia et al. | |
| 2020/0195725 | A1* | 6/2020 | Liang | H04L 67/1097 |
| 2020/0374742 | A1* | 11/2020 | Chong | H04W 72/542 |
| 2021/0006614 | A1* | 1/2021 | Oyman | H04N 19/30 |
| 2021/0068020 | A1* | 3/2021 | Ke | H04W 36/0022 |
| 2022/0086698 | A1* | 3/2022 | Yao | H04W 28/0268 |
| 2022/0264680 | A1* | 8/2022 | Kim | H04W 76/15 |

FOREIGN PATENT DOCUMENTS

| | | |
|---|---|---|
| CN | 110446081 A | 11/2019 |
| CN | 111885549 A | 11/2020 |
| JP | 2012175376 A | 9/2012 |
| WO | 2019157673 A1 | 8/2019 |
| WO | 2020087329 A1 | 5/2020 |

OTHER PUBLICATIONS

European Search Report for corresponding application EP21833898; Report dated Nov. 7, 2023.
European Patent Office Action for corresponding application 21833898. 6; Report dated Apr. 22, 2025, 6 pages.

* cited by examiner

TX: Transmission

Fig. 7

INFORMATION ACQUISITION METHOD AND APPARATUS, STORAGE MEDIUM, AND ELECTRONIC APPARATUS

CROSS REFERENCE

This application is a National Stage Filing of the PCT International Application No. PCT/CN2021/088981 filed on Apr. 22, 2021, which claims priority to Chinese Patent Application No. 202010605286.1 filed on Jun. 29, 2020, the entirety of which is herein incorporated by reference.

TECHNICAL FIELD

Embodiments of the present disclosure relate to the field of communications, and in particular, to an information acquisition method and apparatus, a storage medium, and an electronic apparatus.

BACKGROUND

In current competitive communication and internet environments, it is important for operators and equipment manufacturers to be aware of network changes, improve service sensing capabilities, and pertinently construct, maintain and optimize a network in order to improve their competitiveness. To sense the external environment and internal information of a wireless communication system, information acquisition needs to be performed at different positions, and acquired information needs to be transferred to different information nodes for different data processing. However, there are several problems in the process of transmitting the sensed information, including, for example, long interaction time, redundancy generated by enormous and disordered sensed information, and complicated information transmission and processing methods. These problems make it hard to guarantee the service quality and the latency requirements when transmitting the sensed information.

SUMMARY

The embodiments of the present disclosure provide an information acquisition method and apparatus, a storage medium, and an electronic apparatus, which may at least solve the problems in the related art that a transmission process for sensed information in a communication system is complex and it is difficult to guarantee latency and service quality.

According to an embodiment of the present disclosure, there is provided an information acquisition method, including the following operations: a first network element obtains first acquisition information indication; the first network element determines acquisition indication information corresponding to the first network element according to the first acquisition information indication; and the first network element performs information acquisition and processing according to the acquisition indication information corresponding to the first network element.

In an exemplary embodiment, after the first network element obtains the first acquisition information indication, the method further includes: the first network element generates second acquisition information indication according to the first acquisition information indication; and the first network element sends the second acquisition information indication to a second network element.

In an exemplary embodiment, the acquisition indication information corresponding to the first acquisition indication information and/or the second acquisition indication information includes at least one of following parameters: acquisition precision, priority of acquired content, reliability of the acquired content, acquisition latency requirement, Quality of Service (QoS) of the acquired content, life cycle of the acquired content, and service requirement indication.

In an exemplary embodiment, the acquisition indication information corresponding to the first acquisition information indication and/or the second acquisition information indication includes at least one of following parameters: an acquisition position, an object to be acquired, an acquisition type, an acquisition period, an acquisition mode, and a transmission mode of acquired content.

In an exemplary embodiment, the acquisition mode includes at least one of: centralized acquisition, distributed acquisition, transparent transmission acquisition, direct acquisition, and indirect acquisition.

In an exemplary embodiment, the acquisition indication information corresponding to the first acquisition indication information and/or the second acquisition indication information further includes an information processing parameter, and the information processing parameter includes at least one of: a data processing manner, a data encryption manner, a data compression manner, and a data statistics manner.

In an exemplary embodiment, the data processing manner includes at least one of: data averaging, data weighting, data filtering, and data removing.

In an exemplary embodiment, the data encryption manner includes at least one of: performing data encryption, not performing data encryption, and an adopted encryption key.

In an exemplary embodiment, the data compression manner includes at least one of: performing data compression, not performing data compression, and a compression mode.

In an exemplary embodiment, the first network element obtains the first acquisition information indication according to at least one of: acquisition position information of the first network element, content information that needs to be acquired at an acquisition position of the first network element, service requirement indication received from a third network element, and acquisition information indication received from the third network element.

In an exemplary embodiment, the first network element determines service requirement indication corresponding to the first network element according to at least one of: the first acquisition information indication, service requirement indication received from a third network element, and acquisition information indication received from the third network element.

In an exemplary embodiment, the first network element further determines the second acquisition information indication according to at least one of: acquisition position information of the second network element, content information that needs to be acquired at an acquisition position of the second network element, service requirement indication of the first network element, service requirement indication obtained from a third network element, and acquisition information indication obtained from the third network element.

In an exemplary embodiment, the second network element determines acquisition indication information corresponding to the second network element according to at least one of: acquisition position information of the second network element, content information that needs to be acquired at an acquisition position of the second network element, the second acquisition information indication obtained from the first network element, the first acquisition information indication obtained from the first network element, service requirement indication corresponding to a third network element and obtained from the first network element, and acquisition information indication corresponding to the third network element and obtained from the first network element.

In an exemplary embodiment, the acquisition information indication received by the first network element from the third network element is: the first acquisition information indication corresponding to the first network element or third acquisition information indication corresponding to the third network element; and the service requirement indication received by the first network element from the third network element is service requirement indication corresponding to the first network element, or service requirement indication corresponding to the third network element, or service requirement indication shared by multiple network elements.

In an exemplary embodiment, the service requirement indication includes at least one of: service capability, service requirement, service purpose, condition, policy, report content, and service intention.

In an exemplary embodiment, the acquisition information indication is an index or an identifier of an acquisition parameter set.

According to another embodiment of the present disclosure, provided is an information acquisition apparatus. The information acquisition apparatus is located in a first network element and includes: an acquisition unit, configured to obtain first acquisition information indication, determine acquisition indication information corresponding to the first network element according to the first acquisition information indication, and perform information acquisition and processing according to the acquisition indication information corresponding to the first network element.

In an exemplary embodiment, the acquisition unit is configured to obtain the first acquisition information indication according to at least one of: acquisition position information obtained by the first network element, content information that needs to be acquired at an acquisition position of the first network element, acquisition information indication generated by the first network element, service requirement indication obtained from a third network element, and acquisition information indication obtained from the third network element.

In an exemplary embodiment, the information acquisition apparatus further includes: a serving unit, configured to determine service requirement indication of the first network element, wherein the first network element determines the service requirement indication corresponding to the first network element according to at least one of: the first acquisition information indication, service requirement indication received from a third network element, and acquisition information indication received from the third network element.

In an exemplary embodiment, the information acquisition apparatus further includes: a serving unit, configured to generate second acquisition information indication, and send the second acquisition information indication to a second network element.

In an exemplary embodiment, the first network element at least includes one of: a general logic unit, a general entity, a general node, a dedicated logic unit, a dedicated entity, or a dedicated node.

According to another embodiment of the present disclosure, also provided is a computer-readable storage medium. The computer-readable storage medium stores a computer program, and the computer program is configured to execute, when running, the operations in any one of the method embodiments.

According to another embodiment of the present disclosure, also provided is an electronic device, including a memory and a processor, wherein the memory stores a computer program, and the processor is configured to run the computer program so as to execute the operations in any one of the method embodiments.

By means of the described embodiments of the present disclosure, during the transmission of an information stream, the QoS of the information stream is guaranteed on a transmission layer and a processing layer by virtue of the acquisition information indication, thereby solving the problems in the related art that the implementation of the information transmission process in a communication system is relatively complex and it is difficult to guarantee latency and service quality, and achieving the effects that the capability of information sensing in a communication system is enhanced, the implementation during the information transmission is simple, the QoS can be highly guaranteed, and the solution is applicable to multiple kinds of network architectures.

DETAILED DESCRIPTION

The embodiments of the present disclosure will be described below in detail with reference to the accompanying drawings and in conjunction with embodiments.

It should be noted that terms "first", "second", and the like in the description, claims, and drawings of the present disclosure are used to distinguish similar objects, and are not necessarily used to describe a specific sequence or order.

Figure 1:
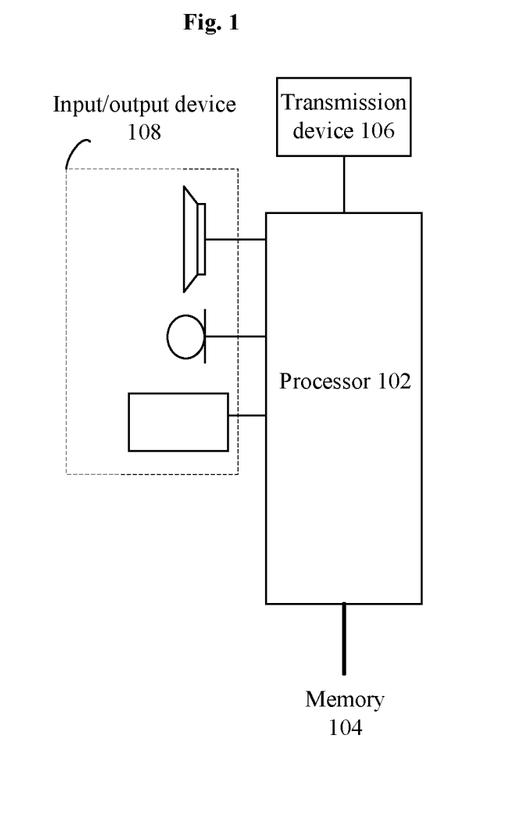
FIG. 1 is a schematic diagram of a hardware structure of a computer terminal for implementing the method of the embodiments of the present disclosure.

The method embodiments provided in the embodiments of the present application may be executed in a computer terminal, a computer device, a server, or a similar computing apparatus. Taking running in the computer terminal as an example, FIG. 1 is a schematic diagram of a hardware structure of a computer terminal for implementing the method of the embodiments of the present disclosure. As shown in FIG. 1, the computer terminal may include one or more (only one is shown in FIG. 1) processors 102 (the processors 102 may include, but are not limited to, processing apparatuses such as a Microcontroller unit (MCU) or a Field-Programmable Gate Array (FPGA)) and a memory 104 configured to store data. The computer terminal may further include a transmission device 106 configured to communicate with and an input/output device 108. A person having ordinary skill in the art may understand that, the structure shown in FIG. 1 is merely exemplary, and does not limit the structure of the foregoing computer terminal. For example, the computer terminal may further include more or fewer components than shown in FIG. 1, or have a different configuration from that shown in FIG. 1.

The memory 104 may be configured to store a computer program, for example, a software program and module of application software, such as a computer program corresponding to the method in the embodiments of the present disclosure. The processor 102 may be configured to execute various function applications and data processing by running the computer program stored in the memory 104, thereby implementing the foregoing method. The memory 104 may include high-speed random access memory, and may also include non-volatile memory, such as one or more magnetic storage devices, flash memory, or other non-volatile solid-state memory. In some examples, the memory 104 may further include one or more memories remotely located with respect to the processor 102, which may be connected to the computer terminal over a network. Examples of such networks includes, but is not limited to, the Internet, an intranet, a local area network, a mobile communication network, or a combination thereof.

The transmission device 106 is arranged to receive or transmit data via one network. Specific examples of the network described above may include a wireless network or a wired network provided by a communication provider or other hybrid types of networks. In an example, the transmission device 106 may include a Network Interface Controller (NIC) that may be coupled to other network devices to communicate with the Internet.

Figure 2:
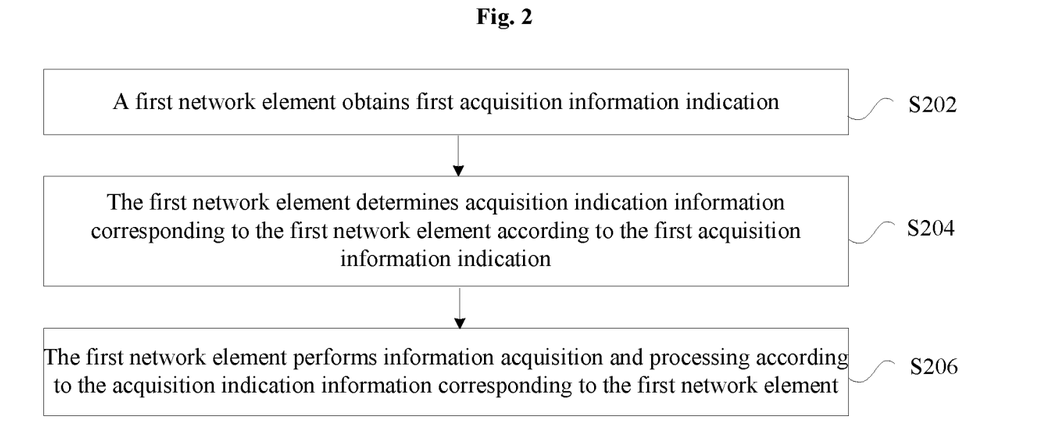
FIG. 2 is a flowchart of an information acquisition method according to the embodiments of the present disclosure.

Provided in the present embodiment is an information acquisition method running on the described computer terminal or network architecture. FIG. 2 is a flowchart of an information acquisition method according to the embodiments of the present disclosure. As shown in FIG. 2, the flow includes operations S202 to S206 which are described in detail below.

At S202, a first network element obtains first acquisition information indication.

At S204, the first network element determines acquisition indication information corresponding to the first network element according to the first acquisition information indication.

At S206, the first network element performs information acquisition and processing according to the acquisition indication information corresponding to the first network element.

After the operation S202 of the embodiment, the method may further include an operation that the first network element generates second acquisition information indication according to the first acquisition information indication, and the first network element sends the second acquisition information indication to a second network element.

In the embodiment, the acquisition indication information corresponding to the first acquisition indication information and/or the second acquisition indication information includes at least one of following parameters: acquisition precision, priority of acquired content, reliability of the acquired content, acquisition latency requirement, QoS of the acquired content, life cycle of the acquired content, and service requirement indication.

In the embodiment, the acquisition indication information corresponding to the first acquisition information indication and/or the second acquisition information indication includes at least one of following parameters: an acquisition position, an object to be acquired, an acquisition type, an acquisition period, an acquisition mode, and a transmission mode of acquired content.

The acquisition mode may be one or a combination of: centralized acquisition, distributed acquisition, transparent transmission acquisition, direct acquisition, and indirect acquisition.

In the embodiment, the first acquisition information indication and the second acquisition information indication further include an information processing parameter, wherein the information processing parameter includes at least one of: a data processing manner, a data encryption manner, a data compression manner, and a data statistics manner.

The data processing manner may be one or a combination of: data averaging, data weighting, data filtering, and data removing.

The data encryption manner may be one or a combination of: performing data encryption, not performing data encryption, and an adopted encryption key.

The data compression manner may be one or a combination of: performing data compression, not performing data compression, and a compression mode.

In the embodiment, the first network element obtains the first acquisition information indication according to one of: acquisition position information of the first network element, content information that needs to be acquired at an acquisition position of the first network element, service requirement indication received from a third network element, or acquisition information indication received from the third network element.

In the embodiment, the first network element determines service requirement indication corresponding to the first network element according to one of: the first acquisition information indication, service requirement indication received from a third network element, or acquisition information indication received from the third network element.

In an exemplary embodiment, the acquisition information indication obtained by the first network element from the third network element is the first acquisition information indication or acquisition information indication corresponding to the third network element.

In the embodiment, the first network element determines the second acquisition information indication according to at least one of: acquisition position information of the second network element, content information that needs to be acquired at an acquisition position of the second network element, service requirement indication of the first network element, service requirement indication obtained from a third network element, and acquisition information indication obtained from the third network element.

In the embodiment, after the second network element sends the second acquisition information indication to the second network element, the method further includes: the second network element determines acquisition indication information corresponding to the second network element according to at least one of: acquisition position information of the second network element, content information that needs to be acquired at an acquisition position of the second network element, the second acquisition information indication obtained from the first network element, the first acquisition information indication obtained from the first network element, service requirement indication corresponding to a third network element and obtained from the first network element, and acquisition information indication corresponding to the third network element and obtained from the first network element.

In the embodiment, the acquisition information indication received by the first network element from the third network element is: the first acquisition information indication corresponding to the first network element or third acquisition information indication corresponding to the third network element; and the service requirement indication received by the first network element from the third network element is service requirement indication corresponding to the first network element, or service requirement indication corresponding to the third network element, or service requirement indication shared by multiple network elements.

In the embodiment, the service requirement indication includes at least one of: service capability, service requirement, service purpose, condition, policy, report content, and service intention.

In the embodiment, the acquisition information indication is an index or an identifier of an acquisition parameter set.

In the embodiments of the present disclosure, during the transmission of an information stream, the QoS of the information stream is guaranteed on a transmission layer and a processing layer by virtue of the acquisition information indication, thereby solving the problems in the related art that information that can be sensed in a communication system is limited, the implementation of an information transmission process is complex and it is difficult to guarantee service quality, and achieving the effects that an information range that can be sensed in the communication system is expanded, the capability of information sensing in the communication system is enhanced, the implementation during the information transmission is simple, the QoS can be highly guaranteed, and the solution is applicable to multiple kinds of network architectures.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the related art may be embodied in the form of a software product. The computer software product is stored in a storage medium (such as a ROM/RAM, a magnetic disk, or an optical disk), and includes several instructions for instructing a terminal device (which may be a mobile phone, a computer, a server, or a network device) to execute the methods described in the embodiments of the present disclosure.

An information acquisition apparatus is also provided in the embodiments of the present disclosure. The information acquisition apparatus is used for implementing the described embodiments and exemplary implementations, and what has been described will not be elaborated. As used below, the term "module" is a combination of software and/or hardware that may implement a predetermined function. Although the information acquisition apparatus described in the following embodiments is preferably implemented by software, implementation of hardware or a combination of software and hardware is also possible and conceivable.

Figure 3:
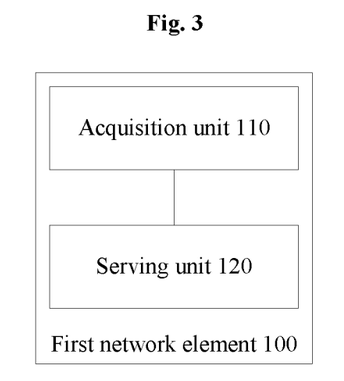
FIG. 3 is a structure block diagram of an information acquisition apparatus according to the embodiments of the present disclosure.

FIG. 3 is a structure block diagram of an information acquisition apparatus according to the embodiments of the present disclosure. The information acquisition apparatus is located in a first network element 100. As shown in FIG. 3, the information acquisition apparatus includes an acquisition unit 110, configured to obtain first acquisition information indication corresponding to the first network element 100, determine acquisition indication information corresponding to the first network element 100 according to the first acquisition information indication, and perform information acquisition and processing according to the acquisition indication information corresponding to the first network element 100.

In the embodiment, the acquisition unit 110 may be configured to obtain the first acquisition information indication according to at least one of: acquisition position information obtained by the first network element, content information that needs to be acquired at an acquisition position of the first network element, acquisition information indication generated by the first network element, service requirement indication obtained from a third network element, and acquisition information indication obtained from the third network element.

In an exemplary embodiment, the information acquisition apparatus further includes: a serving unit 120, configured to determine service requirement indication of the first network element, wherein the first network element determines the service requirement indication corresponding to the first network element according to at least one of: the first acquisition information indication, service requirement indication received from a third network element, and acquisition information indication received from the third network element.

In an exemplary embodiment, the serving unit 120 may be further configured to generate second acquisition information indication according to the first acquisition information indication, and send the second acquisition information indication to the second network element.

In the embodiment, the first network element may be a general logic unit, a general entity, a general node, a dedicated logic unit, a dedicated entity, or a dedicated node.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure also provide a computer-readable storage medium. The computer-readable storage medium stores a computer program, wherein the computer program is configured to execute, when running, the operations in any one of the described method embodiments.

In an exemplary embodiment, the computer-readable storage medium may include, but is not limited to, any medium that can store a computer program, such as a U disk, a Read-Only Memory (ROM), a Random Access Memory (RAM), a mobile hard disk, a magnetic disk, or an optical disk.

The embodiments of the present disclosure further provide an electronic apparatus, including a memory and a processor. The memory stores a computer program. The processor is configured to run the computer program to execute the operations in any one of the method embodiments.

In an exemplary embodiment, the electronic apparatus may further include a transmission device and an input/ output device, wherein the transmission device is connected to the processor, and the input/output device is connected to the processor.

For specific examples in the embodiment, reference may be made to the examples described in the foregoing embodiments and exemplary embodiments, and details are not repeatedly described in the present embodiment.

To facilitate understanding of the technical solutions provided in the embodiments of the present disclosure, the embodiments under specific scenarios are described in detail below.

Figure 4:
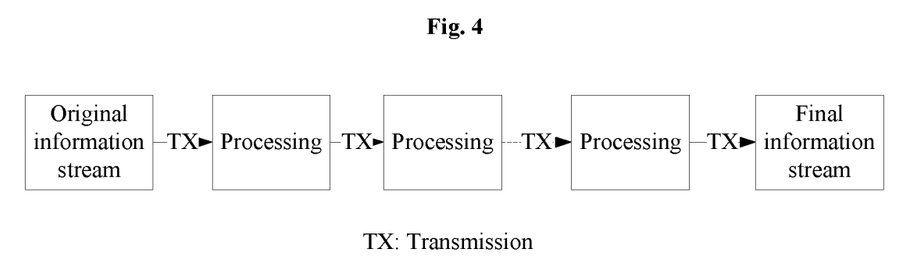
FIG. 4 is a schematic diagram of information stream transmission according to the embodiments of the present disclosure.

In order to meet the service requirements, a communication network needs to acquire original information, and as shown in FIG. 4, the information needs to be subjected to multiple transmission procedures and processing procedures before final required content can be obtained. In the process of transmitting and processing the information, in addition to processing data, attributes such as latency and priority of the information need to be controlled, so as to guarantee that important information can be effectively obtained in time, and reasonable selection (whether to keep the information or discard the information) can be performed when congestion occurs.

To achieve end-to-end QoS control with respect to information, the embodiments of the present disclosure use acquisition information indication to achieve precision and effectiveness in information transmission and processing. In the embodiment, each acquisition source has an acquisition information indication, and the acquisition information indication includes a set of attribute parameters and one or more processing rules. The acquisition information indication may be an index or identifier of an acquisition parameter set, and is used for performing QoS control on a sensed information stream on a transmission layer and a processing layer.

Each set of attribute parameters may contain parameters such as acquisition type, position, acquisition precision, acquisition period, priority, reliability, latency requirement, and life cycle, which serve as information indication parameters on the transmission layer and provide QoS assurance on the transmission layer. The acquisition type reflects a classification of acquired information, such as signaling, data, service, and measurement. The priority reflects the degree of importance of the sensed information (acquired information), for example, information required by a latency-sensitive service, information that has great influence on basic performance, and the like, and according to the priority, it can be decided whether the information should be preferentially processed and transmitted or can be discarded when congestion occurs. The latency information reflects latency guarantees of a service. The life cycle parameter contained in the attribute parameters may control the generation and invalidation of the sensed information. The acquisition period includes a period of time at symbol level, subframe level, radio frame level, or the like. The acquisition precision includes precision at millisecond level, subcarrier level, resource block level, user level, cell level, or the like. Among the various acquisition modes, the centralized acquisition refers to an acquisition mode of gathering the information to one acquisition source for processing; the distributed acquisition refers to an acquisition mode of locally processing the information; and transparent transmission acquisition refers to an acquisition mode of implementing information acquisition by transmitting the acquired information via an intermediate node which does not process the acquired information. For example, information acquisition performed by a Centralized Unit (CU) from a plurality of Distributed Units (DUs) belongs to centralized acquisition; acquisition and processing of local User Plane Function (UPF) information performed by respective local Multi-access edge computing (MEC) belongs to distributed acquisition; and when an RRC (Radio Resource Control) layer acquires physical layer information, the behavior, on an MAC layer and an RLC layer, of not processing the physical layer information and transparently transmitting the physical layer information to the RRC layer belongs to transparent transmission acquisition.

In the embodiment, the acquisition source may determine a specific object to be acquired and a specific acquisition method based on the indication provided by a plurality of parameters in the attribute parameters.

During information acquisition, each processing rule includes a data processing method, which serves as quality assurance indication of a processing layer concerning the processing of the acquired information. The data processing method includes, but is not limited to, a data processing manner, a data encryption manner, a data compression manner and a data statistics manner. The data processing manner includes, but is not limited to, data averaging, data weighting, data filtering, data removing, and the like. The data encryption manner includes, but is not limited to, performing data encryption, not performing data encryption, an adopted encryption key, and the like. The data compression manner includes, but is not limited to, performing data compression, not performing data compression, and a compression mode. By using the acquisition information indication, transmission quality is guaranteed on the transmission layer in terms of reliability, priority, latency, fault-tolerance, and the like for the sensed information, and the sensing service requirement and transmission requirement are satisfied by processing (performing data processing, encryption, compression, statistics, and the like) the acquired information on the processing layer. The processing modules in FIG. 4 correspond to data processing on the processing layer, and the connection lines between two processing modules represent QoS control on the transmission layer.

Embodiment 1

In the embodiment, the case that different acquisition indication information is used on the physical layer and the RRC layer is taken as an example for description. By acquiring reference information, the signal quality can be obtained, and the channel condition of a wireless network can be learned. As shown in Table 1, at different positions, requirements for acquiring reference information are different, and corresponding acquisition indication information is also different.

TABLE 1

| | Physical layer signal quality acquisition, corresponding to acquisition information indication index 0 | RRC layer signal quality acquisition, corresponding to acquisition information indication index 1 |
|---|---|---|
| Acquisition indication information | | |
| Acquisition precision | Subcarrier level | Resource block level |
| Acquisition period | Symbol where each reference signal is located | One radio frame |
| Acquisition priority | Low level | Intermediate level |
| Data processing system | Layer 1 filtration | Layer 3 filtration |

Taking the acquisition of a reference signal on a physical layer as an example, after receiving a corresponding physical layer acquisition information indication index, a physical layer acquisition unit reads the indication information, and can determine that the object to be acquired is a Channel State Information Reference Signal (CSI-RS), with the acquisition precision being a sub-carrier level, the acquisition period being one CSI-RS period, and the priority being medium. The processing method is that all acquired data are subjected to layer 1 filtration and are not encrypted.

Taking the acquisition of signal quality information on a RRC layer as an example, after receiving a corresponding acquisition information indication index of the RRC layer, the RRC layer acquisition unit reads the configuration information in the acquisition information indication, and can determine that the object to be acquired is a CSI-RS, with the acquisition precision being a resource block level, the acquisition period being one radio frame, and the priority being high. The processing method is that all acquired data are subjected to layer 3 filtration and are not encrypted.

In the embodiment, the adoption of the acquisition information indication guarantees, at the transmission layer and the processing layer, the QoS of information streams acquired by different CSI-RSs on the physical layer and the RRC layer.

Embodiment 2

In the present embodiment, acquisition information indication is determined according to an acquisition position and content to be acquired, i.e., the acquisition unit itself generates an acquisition information indication identifier. In the present embodiment, the acquisition unit determines an acquisition position and content to be acquired corresponding to a signaling Radio Bearers (SRB), so as to determine an acquisition information indication identifier of the SRB. By means of the method, the adoption of the acquisition information indication guarantees, at the transmission layer and the processing layer, the QoS of an acquired information stream of system configuration information on an SRB.

Figure 5:
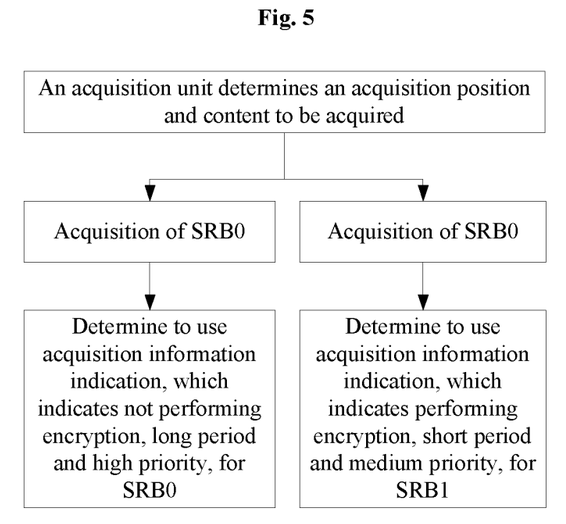
FIG. 5 is a schematic diagram of determining acquisition information indication for a signaling radio bearer (SRB) according to the embodiments of the present disclosure.

The information on the SRB is information very important for a network and a terminal. For example, the information carried on the SRB0 is updated at a relatively long interval. The information carried on the SRB0 is public information and therefore does not need to be encrypted. Because the information carried on the SRB0 is system information and has a high reliability requirement, this information corresponds to a high priority. For example, the information carried on SRB1 has a high requirement on security and therefore needs to be encrypted. As shown in FIG. 5, when determining the acquisition position and the acquisition content of the SRB, the acquisition unit may further determine the acquisition information indication identifier corresponding to the SRB.

Embodiment 3

In the embodiment, an RLC layer generates acquisition information indication for retransmission information acquisition on the MAC layer, that is, a first network element determines the acquisition information indication of a second network element.

Figure 6:
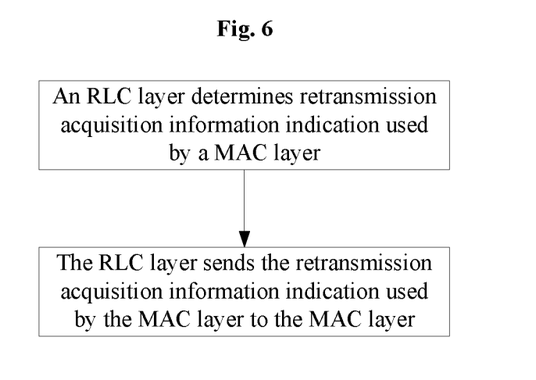
FIG. 6 is a schematic diagram of determining, by a Radio Link Control (RLC) layer, retransmission information acquisition indication for a Medium Access Control (MAC) layer according to the embodiments of the present disclosure.

There is a retransmission mechanism in both the RLC layer and the MAC layer. The RLC layer adopts a slow Automatic Repeat request (ARQ) mechanism, and the MAC layer adopts a fast Hybrid Automatic Repeat request (HARQ) mechanism. As shown in FIG. 6, when the retransmission information is acquired, if the retransmission information of the MAC layer is needed, the RLC layer determines, according to an index of a retransmission packet of the RLC layer, the number of retransmissions and a buffer size, acquisition information indication (such as an object to be acquired, a position and a latency) corresponding to the MAC layer, and sends the acquisition information indication of the MAC layer to the MAC layer.

Embodiment 4

Figure 7:
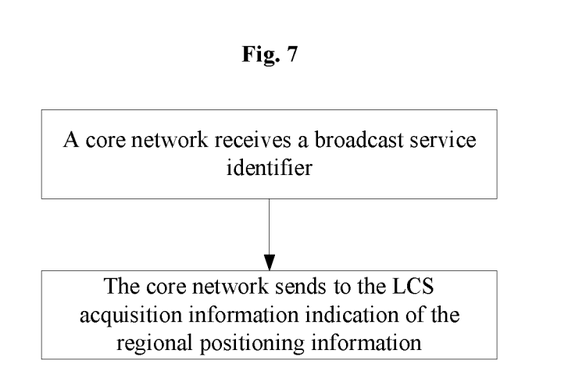
FIG. 7 is a schematic diagram of determining region information acquisition indication according to a service requirement according to the embodiments of the present disclosure.

The present embodiment relates to regional information acquisition based on service requirement indication. For example, for a service such as advertisement delivery in a shopping mall, it is necessary to acquire positioning information so as to determine users in the corresponding region, and broadcast services to the users in the region. As shown in FIG. 7, when receiving a service identifier representing a broadcast demand, a core network sends acquisition information indication to a Location Service (LCS), wherein the acquisition information indication contains information such as the precision of the positioning distance, transmission latency requirement and priority. After receiving the acquisition information indication, the LCS acquires and processes information of users in the region according to the indication and transfers the acquired information to an application layer. In the present example, the third network element is a third-party application, and the third-party application sends the service requirement indication for regional broadcasting and the acquisition information indication. In the present example, the first network element is an MEC. After receiving the service requirement indication and the acquisition information indication from the third-party application, the first network element determines the acquisition information indication and the service requirement indication of the LCS on the MEC, and determines the acquisition information indication on the LCS. The MEC may send the acquisition information indication on the LCS to the LCS, and the LCS may perform the acquisition of the positioning information according to the received acquisition information indication.

In the embodiments of the present disclosure, during the information stream transmission process, the acquisition information indication is used to guarantee the service quality of the information stream on the transmission layers and the processing layer. The technical solutions provided in the embodiments of the present disclosure are applicable to information sensing in an existing communication system and a future communication architecture, and can be applicable to information sensing and intention network based on a service-based architecture or a domain-based architecture.

It is apparent that a person having ordinary skill in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection defined by the appended set of claims of the present disclosure.

What is claimed is:

1. An information acquisition method, comprising:
obtaining, by a first network element, first acquisition information indication, wherein the first acquisition information indication is an index or an identifier of a set of acquisition parameters; wherein the acquisition parameters comprises at least one of following: acquisition precision, priority of acquired content, reliability of the acquired content, acquisition latency requirement, Quality of Service (QoS) of the acquired content, life cycle of the acquired content, and service requirement indication;
determining, by the first network element, acquisition indication information corresponding to the first network element according to the first acquisition information indication; wherein the acquisition indication information corresponding to the first acquisition indication information comprises one or more acquisition parameters corresponding to the first network element in the set of the acquisition parameters; and
performing, by the first network element, information acquisition and processing according to the acquisition indication information corresponding to the first network element;
wherein the first network element obtains the first acquisition information indication according to at least one of: acquisition position information of the first network element, content information that needs to be acquired at an acquisition position of the first network element;
wherein after obtaining, by the first network element, the first acquisition information indication, the information acquisition method further comprises: generating, by the first network element, second acquisition information indication according to the first acquisition information indication; and sending, by the first network element, the second acquisition information indication to a second network element.

2. The information acquisition method according to claim 1, wherein the acquisition indication information corresponding to the second acquisition indication information comprises at least one of following parameters: acquisition precision, priority of acquired content, reliability of the acquired content, acquisition latency requirement, Quality of Service (QoS) of the acquired content, life cycle of the acquired content, and service requirement indication.

3. The information acquisition method according to claim 1, wherein the acquisition indication information corresponding to the first acquisition information indication and/or the second acquisition information indication comprises at least one of following parameters: an acquisition position, an object to be acquired, an acquisition type, an acquisition period, an acquisition mode, and a transmission mode of acquired content.

4. The information acquisition method according to claim 3, wherein the acquisition mode comprises at least one of: centralized acquisition, distributed acquisition, transparent transmission acquisition, direct acquisition, and indirect acquisition.

5. The information acquisition method according to claim 1, wherein the acquisition indication information corresponding to the first acquisition indication information and/or the second acquisition indication information further comprises an information processing parameter, and the information processing parameter comprises at least one of: a data processing manner, a data encryption manner, a data compression manner, and a data statistics manner.

6. The information acquisition method according to claim 5, wherein the data processing manner comprises at least one of: data averaging, data weighting, data filtering, and data removing.

7. The information acquisition method according to claim 5, wherein the data encryption manner comprises at least one of: performing data encryption, not performing data encryption, and an adopted encryption key.

8. The information acquisition method according to claim 5, wherein the data compression manner comprises at least one of: performing data compression, not performing data compression, and a compression mode.

9. The information acquisition method according to claim 1, wherein the first network element obtains the first acquisition information indication further according to at least one of: service requirement indication received from a third network element, and acquisition information indication received from the third network element.

10. The information acquisition method according to claim 1, wherein the first network element determines service requirement indication corresponding to the first network element according to at least one of: the first acquisition information indication, service requirement indication received from a third network element, and acquisition information indication received from the third network element.

11. The information acquisition method according to claim 1, wherein the first network element further determines the second acquisition information indication according to at least one of: acquisition position information of the second network element, content information that needs to be acquired at an acquisition position of the second network element, service requirement indication of the first network element, service requirement indication obtained from a third network element, and acquisition information indication obtained from the third network element.

12. The information acquisition method according to claim 1, wherein the second network element determines acquisition indication information corresponding to the second network element according to at least one of: acquisition position information of the second network element, content information that needs to be acquired at an acquisition position of the second network element, the second acquisition information indication obtained from the first network element, the first acquisition information indication obtained from the first network element, service requirement indication corresponding to a third network element and obtained from the first network element, and acquisition information indication corresponding to the third network element and obtained from the first network element.

13. The information acquisition method according to claim 10, wherein the acquisition information indication received by the first network element from the third network element is: the first acquisition information indication corresponding to the first network element or third acquisition information indication corresponding to the third network element; and the service requirement indication received by the first network element from the third network element is service requirement indication corresponding to the first network element, or service requirement indication corresponding to the third network element, or service requirement indication shared by multiple network elements.

14. The information acquisition method according to claim 10, wherein the service requirement indication comprises at least one of: service capability, service requirement, service purpose, condition, policy, report content, and service intention.

15. An information acquisition apparatus, located in a first network element and comprising a memory storing instructions and a processor in communication with the memory, wherein the processor is configured to execute the instructions to:
 obtain first acquisition information indication, determine acquisition indication information corresponding to the first network element according to the first acquisition information indication, and perform information acquisition and processing according to the acquisition indication information corresponding to the first network element, wherein the first acquisition information indication is an index or an identifier of a set of acquisition parameters; wherein the acquisition parameters comprises at least one of following: acquisition precision, priority of acquired content, reliability of the acquired content, acquisition latency requirement, Quality of Service (QoS) of the acquired content, life cycle of the acquired content, and service requirement indication; wherein the acquisition indication information corresponding to the first acquisition indication information comprises one or more acquisition parameters corresponding to the first network element in the set of the acquisition parameters;
 wherein the first network element obtains the first acquisition information indication according to at least one of: acquisition position information of the first network element, content information that needs to be acquired at an acquisition position of the first network element;
 wherein after obtaining, by the first network element, the first acquisition information indication, the information acquisition method further comprises: generating, by the first network element, second acquisition information indication according to the first acquisition information indication; and sending, by the first network element, the second acquisition information indication to a second network element.

16. The information acquisition apparatus according to claim 15, wherein the processor is configured to execute the instructions to obtain the first acquisition information indication further according to at least one of: acquisition information indication generated by the first network element, service requirement indication obtained from a third network element, and acquisition information indication obtained from the third network element.

17. The information acquisition apparatus according to claim 15, wherein the processor is configured to execute the instructions to determine service requirement indication of the first network element, wherein the first network element determines the service requirement indication corresponding to the first network element according to at least one of: the first acquisition information indication, service requirement indication received from a third network element, and acquisition information indication received from the third network element.

18. A non-transitory computer-readable storage medium, wherein the computer-readable storage medium stores a computer program, and the computer program is configured to execute, when running on a processor, the information acquisition method of claim 1.

* * * * *